Patented Sept. 27, 1927.

1,643,619

UNITED STATES PATENT OFFICE.

WALTHER CLAASEN, OF COLOGNE-ON-THE-RHINE, GERMANY.

PROCESS FOR THE PRODUCTION OF NEW ESTER MIXTURES.

No Drawing. Application filed March 17, 1926, Serial No. 95,469, and in Germany April 14, 1925.

It is known to produce adipic acid by oxidizing the cyclohexanol formed by the hydrogenation of pure phenol. The purposes for which the product obtained in this manner can be employed are however limited, because the small yield of pure adipic acid makes technical employment on a large scale out of the question for many purposes.

The surprising discovery has been made that the mixture of α-, β-methyl adipic acids and lower homologues, such as for instance glutaric acid, produced by one of the usual oxidation methods from hydrogenated crude cresols, without being first of all separated into their components and after being esterified together with aliphatic, aromatic or cyclic alcohols possesses outstanding properties for technical purposes of the most varied nature.

By using for esterification purposes the whole acid mixture formed by oxidation, the final yield of the new ester mixture is naturally considerably increased, which in conjunction with the cheapness of the crude cresol hitherto not employed for the purposes in view, has a decided influence upon the cost and consequently upon the possibility of technical exploitation.

When the ester mixtures referred to are used as camphor substitutes, extremely valuable products are obtained, which cannot be distinguished in colour and stability, toughness, ductility and buckling resistance from celluloid produced with camphor. Their cheapness however gives them a considerable advantage over the camphor celluloid. Owing to the aforementioned properties, these ester mixtures hitherto unknown, are new products of high commercial value.

For preparing the same, the acid mixture obtained by oxidizing the methyl-cyclohexanols is treated according to known methods with the alcohols concerned, in the presence of a mineral acid and the esters are separated from the reaction mixture in the usual manner.

The general reactions are as follows:—

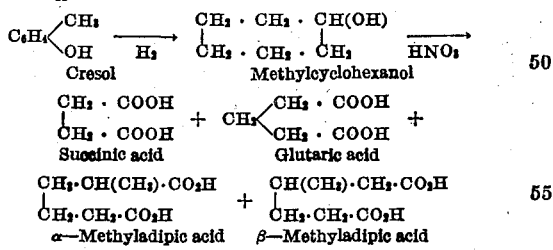

It will be seen that a mixture of various esters is obtained and it is this mixture which is subjected to esterification without separation of the various esters in a state of purity.

*Examples.*

1. 114 gs. of the methyl cyclohexanols formed by catalytic hydrogenation from crude cresols are dropped into 684 gs. of boiling nitric acid of the density 1,2. After the conversion has taken place, evaporation to dryness is carried out and the remaining viscous syrup of the various acids is dissolved in three times the amount of ethyl alcohol, which is mixed with 3% gaseous hydrochloric acid. After boiling in the reflux condenser for several hours, the mixture is poured into water, separated in the separating funnel, and the ester washed with a dilute soda solution for the purpose of separating the acid ester forming at the same time. The boiling point of the ester mixture is 124–150° at 12 mm. pressure. The esters consist of a colourless sweet smelling liquid.

2. The methyl cyclohexyl esters formed in a similar manner by the esterification of the acid mixture by means of methyl cyclohexanols consist of a viscous oil having a not unpleasant smell. The boiling point is 214–241° at 9 mm. pressure.

Having now particularly described and ascertained the nature of my said invention and in what manner the same is to be performed, I declare that what I claim is:—

1. The process of preparing esters of mixtures of adipic acids which comprises oxidizing hydrogenated crude cresols to form mixtures of adipic acids and esterifying the acid mixture without preliminary separation of the mixture into its components.

2. The process of preparing esters of mixed organic acids which comprises oxidizing hexahydrocresols to form a mixture of acids and esterifying the acid mixture without preliminary separation of the mixture into its components.

In testimony whereof I affix my signature.

DR. WALTHER CLAASEN.